United States Patent [19]

Williams et al.

[11] 3,984,525

[45] Oct. 5, 1976

[54] MANUFACTURE OF PHOSPHORIC ACID

[75] Inventors: Thomas Alan Williams, Workington; Alexander Thomson, Whitehaven, both of England

[73] Assignee: Albright & Wilson Limited, West Midlands, England

[22] Filed: Mar. 25, 1974

[21] Appl. No.: 454,092

Related U.S. Application Data

[63] Continuation of Ser. No. 126,888, March 22, 1971, abandoned, which is a continuation of Ser. No. 701,428, Jan. 29, 1968, abandoned.

[30] Foreign Application Priority Data

Feb. 1, 1967  United Kingdom.............. 4028/67

[52] U.S. Cl............................... 423/320; 423/167
[51] Int. Cl.$^2$.......................... C01B 25/16
[58] Field of Search........................ 423/320, 167

[56] References Cited
UNITED STATES PATENTS 3,124,419  3/1964  Germaine et al................. 423/320

FOREIGN PATENTS OR APPLICATIONS 6,609,093  1/1967  Netherlands..................... 423/320

*Primary Examiner*—Oscar R. Vertiz
*Assistant Examiner*—Gregory A. Heller
*Attorney, Agent, or Firm*—Herbert H. Goodman

[57] ABSTRACT

Production of phosphoric acid by the wet process and by-product calcium sulphate hemihydrate. Sulphuric acid reacts with phosphate rock in such conditions that gypsum is precipitated, the resulting slurry is transferred to a second vessel in which the conditions are such that the gypsum recrystallises to calcium sulphate hemihydrate. Calcium sulphate hemihydrate so produced may be converted to cement and sulphuric acid by a process analogous to the anhydrite process for production of sulphuric acid. The phosphoric acid produced may be desulphated in a process integrated with the phosphoric production.

5 Claims, 3 Drawing Figures

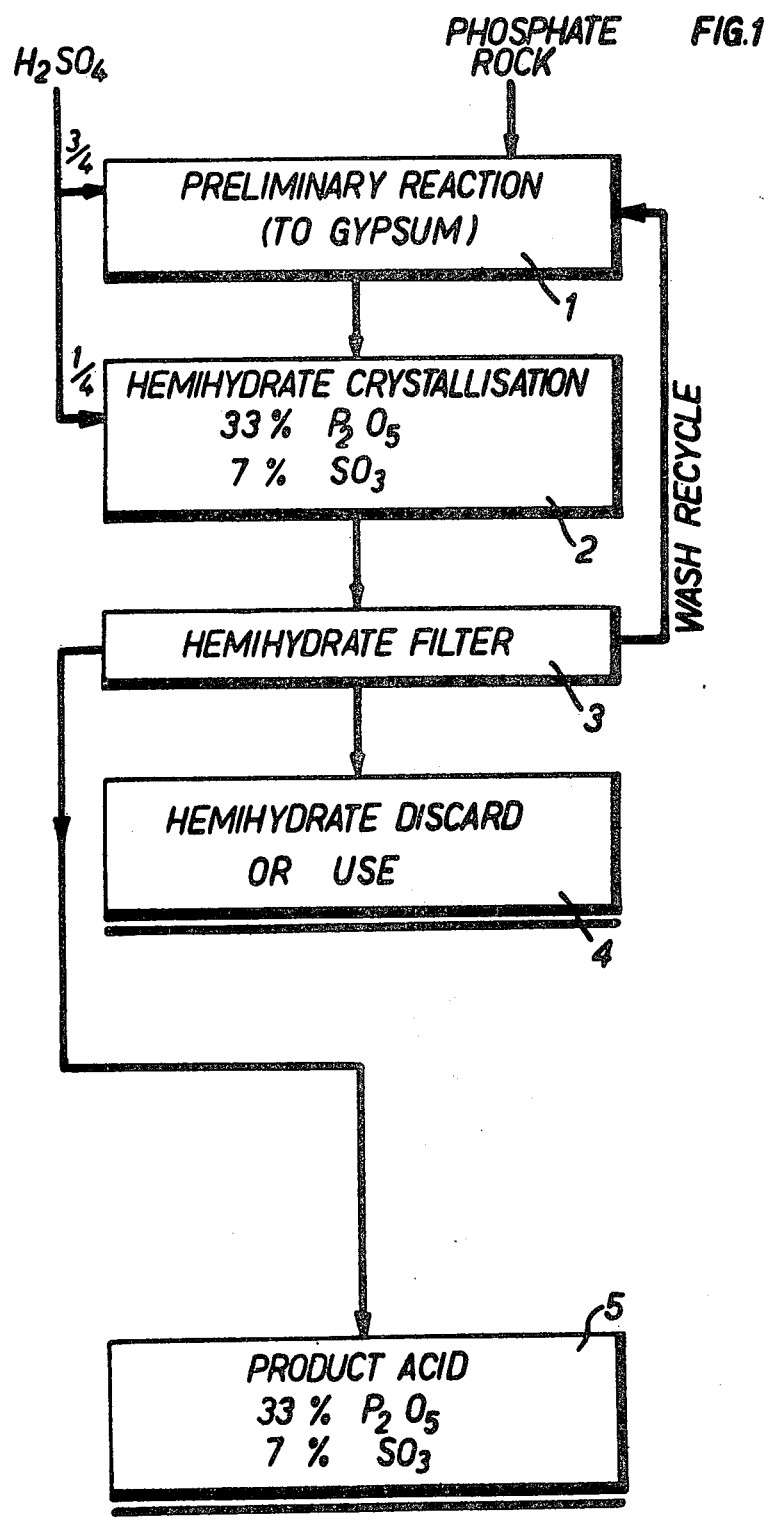

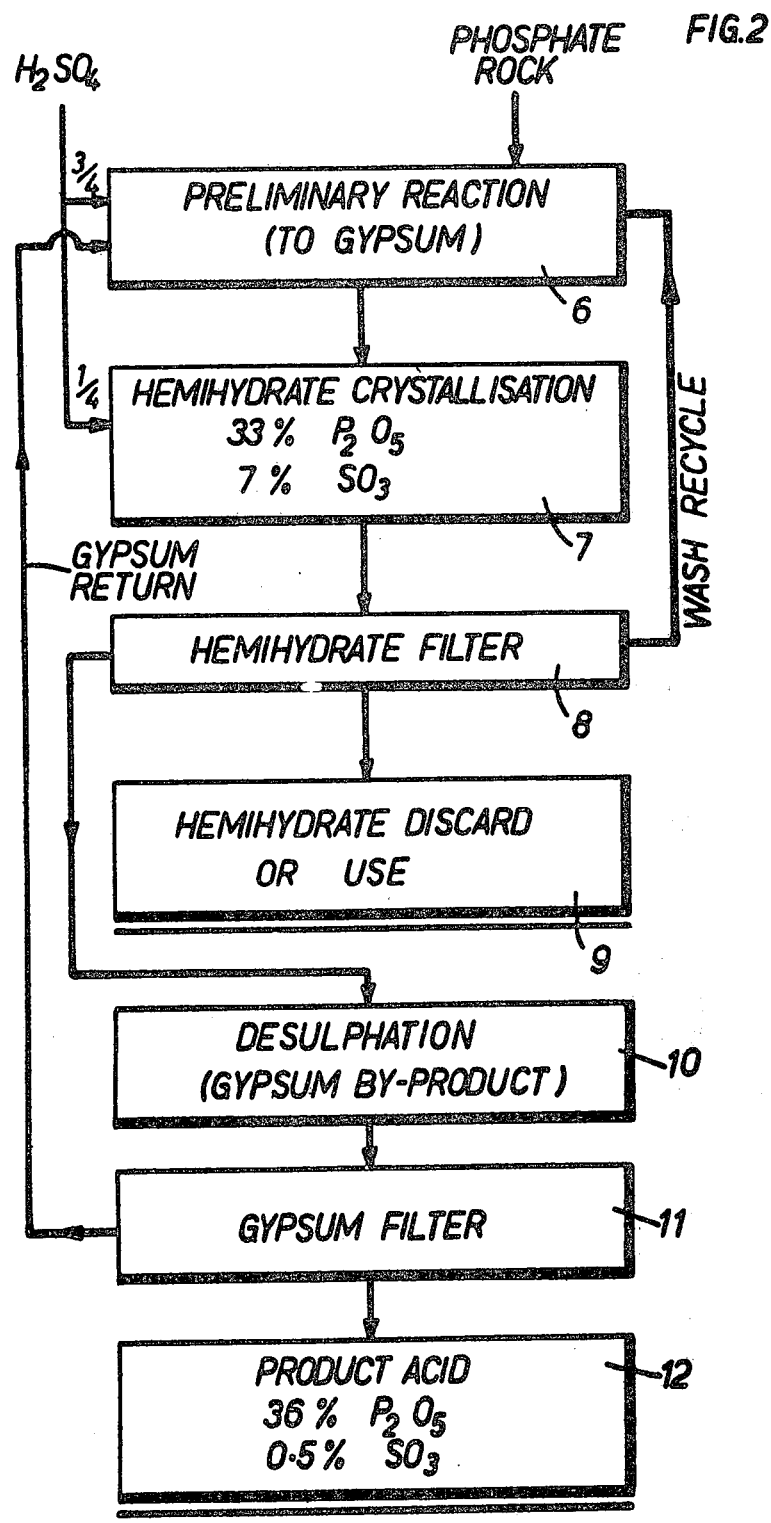

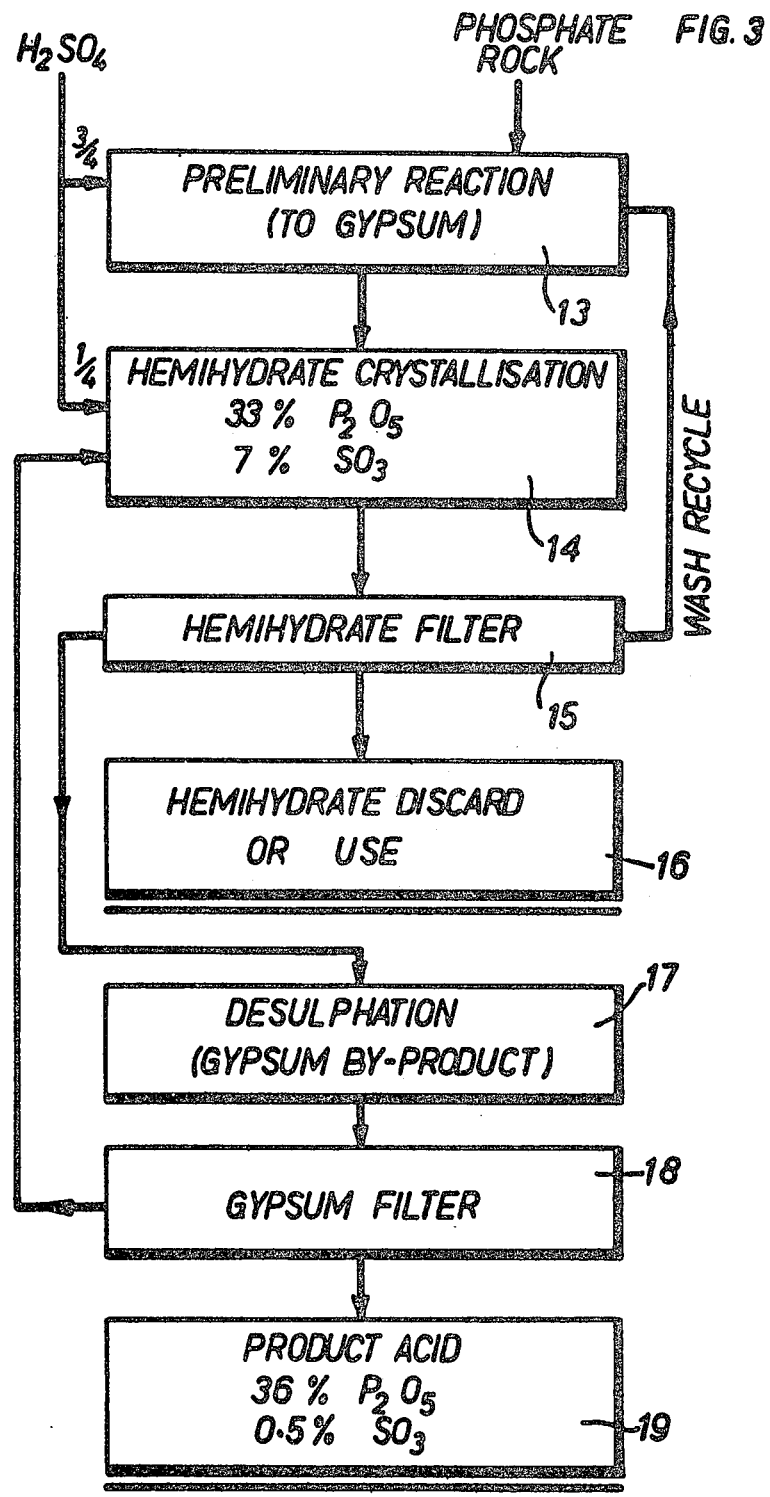

MANUFACTURE OF PHOSPHORIC ACID

This is a continuation of application Ser. No. 126,888 filed Mar. 22, 1971 now abandoned, which was a continuation of Ser. No. 701,428, filed Jan. 29, 1968 and now abandoned.

The present invention relates to the production of phosphoric acid by the wet process and to the production of calcium sulphate hemihydrate as a co-product.

In the manufacture of phosphoric acid by the wet process, it is customary to react phosphate rock with sulphuric acid, or a mixture of sulphuric and phosphoric acids, under such conditions of temperature and ionic concentration that calcium sulphate dihydrate, commonly known as gypsum, is precipitated. If other conditions of temperature and ionic concentration are employed then it is possible to precipitate calcium sulphate hemihydrate and subsequently to cause this to recrystallise to gypsum merely by altering the conditions of ionic concentration and temperature in the appropriate manner.

It is known to cause precipitated gypsum to recrystallise as the hemihydrate by suitably adjusting the conditions of ionic concentration and temperature of the mother liquor. Conditions of higher ionic concentration and temperature are required to cause calcium sulphate to crystallise as the hemihydrate than are required to bring about the crystallisation of gypsum.

In the process of the present invention phosphate rock is treated with sulphuric acid under such conditions of ionic concentration and temperature as to cause gypsum to be precipitated, the resultant slurry of gypsum in aqueous phosphoric acid is transferred to a second vessel in which the conditions are such as to cause the gypsum to recrystallise as calcium sulphate hemihydrate and the calcium sulphate hemihydrate crystals precipitated are then separated from the phosphoric acid. We have found that the phosphoric acid may then be desulphated in a manner which enables the purification step to be incorporated in an integrated process with the production of the acid.

We have also surprisingly found that the calcium sulphate hemihydrate formed may be used in the production of sulphuric acid and Portland cement by the Müller-Kuhne process. In this process, which is described in Industrial and Engineering Chemistry, Volume 49, pages 1204 – 1214, the raw material has hitherto been anhydrite. It is not possible to use gypsum or, in particular, gypsum produced as a by-product in the manufacture of phosphoric acid. Our discovery that calcium sulphate produced in the form of hemi-hydrate as a by-product in phosphoric acid manufacture can be used in the Müller-Kuhne process is of some economic significance, bearing in mind the difficulty of disposing of the by-product gypsum obtained in the conventional phosphoric acid processes. One reason for being able to employ the hemihydrate in this process but not gypsum is believed to be that the half molar proportion of water in the hemihydrate can be tolerated in kilns used in the Müller-Kuhne process whereas the two molar proportions in gypsum cannot because an excessive amount of fuel is needed to drive them off. When the gysum is obtained as a by-product from phosphoric acid manufacture the $P_2O_5$ content is too high to enable the clinker obtained to be a satisfactory raw material for cement. We have discovered, however, that calcium sulphate hemihydrate produced by the process of the present invention, has a considerably lower content of $P_2O_5$, of the order of 0.1%, and the clinker obtained from it is quite suitable for making cement. We believe that this lower $P_2O_5$ content in calcium sulphate hemihydrate produced by the process of the invention as compared to that in gypsum produced as a by-product in processes for the production of phosphoric acid is as a result of the comparative case with which $HPO_4^{2-}$ ions will replace $SO_4^{2-}$ ions in the gypsum crystal lattice, this being a result of the close relationship between the $CaHPO_4 \cdot 2H_2O$ and $CaSO_4 \cdot 2H_2O$ crystal lattices, as compared with its replacing the $SO_4^{2-}$ ion in the crystalographically unrelated $CaSO_4 \cdot \frac{1}{2}H_2O$ lattice.

Sulphuric acid produced by treating the hemihydrate by the Müller-Kuhne process may be used to carry out the attack on phosphate rock in the first stage of the process of the invention.

Accordingly, from a further aspect the present invention provides a process for making phosphoric acid with cement as a by-product, in which phosphate rock and sulphuric acid are caused to react in such conditions of ionic concentration and temperature that gypsum is precipitated, the resulting slurry is transferred to another vessel, the temperature of the slurry is raised to a point at which the gypsum recrystallises as $GaSO_4 \cdot \frac{1}{2} H_2O$, the crystals are separated and converted into $SO_2$ and cement clinker, the clinker is ground to make cement, and the $SO_2$ is converted, for example by a process known as per se, into sulphuric acid.

In performing the process of the invention various methods for producing suitable conditions for the gypsum to re-crystallise to calcium sulphate hemihydrate may be employed. For example simply heating the vessel in which the re-crystallisation is to occur, however the addition of sensible heat is liable to be too costly and difficult. We have found that it is possible to generate the necessary amount of heat in the slurry by the addition of concentrated sulphuric acid which will liberate its heat of solvation in water. Such acid should be concentrated to at least 93% $H_2SO_4$ by weight.

The amount of sulphuric acid required does not render the product phosphoric acid unsatisfactory for certain uses, e.g. in fertiliser manufacture. According to a feature of our invention, however, we remove most of the sulphate content of the acid, both that carried over from the original reaction with phosphate rock and that introduced by the process of the present invention, by the addition of phosphate rock to the acid after removal of the hemihydrate crystals. This results in the precipitation of gypsum which is separated and re-cycled to either the initial reaction vessel or the vessel in which recrystallisation of the gypsum occurs. Such a separation of the gypsum from the acid product may be carried out in any convenient manner, for example by filtration, by centrifuging, or by allowing the crystals to settle down and then decanting the acid. It will be observed that since the amount of gypsum at this stage is comparatively small and can all be recycled, a good separation of gypsum from the product is not necessary.

If it is desired that the calcium sulphate hemihydrate crystals formed by the process of the invention be converted into sulphuric acid and Portland cement this calcium sulphate is mixed with coke and shale and heated first to a temperature at which $SO_2$ is liberated from the calcium sulphate, this commencing at about 450°C and subsequently to a higher temperature to bring about the formation of cement clinker. As the feedstock passes along the kiln the temperature is raised until the cement clinker is formed, this will usually involve raising the temperature to at least 1400°C, preferably about 1500°C. Air is blown through the kiln in the opposite direction to the motion of the feedstock to flush out the sulphur dioxide formed. The sulphur dioxide produced may be converted to sulphuric acid in any convenient fashion and this is frequently carried out by the contact process in which sulphur dioxide is oxidised to the trioxide by passing it over a catalyst, such as vanadium pentoxide, with air and then dissolving the product in moderately concentrated sulphuric acid. However, other methods of carrying out the process may be employed if desired, in particular any known method for converting $SO_2$ into sulphuric acid may be employed.

Specific methods for carrying out processes of the invention will now be described with reference to the accompanying drawings. FIG. 1 is a flow diagram of a process according to the invention for the production of phosphoric acid and calcium sulphate hemihydrate crystals; FIGS. 2 and 3 are flow diagrams for processes for the production of desulphated phosphoric acid and calcium sulphate hemihydrate crystals.

Turning to FIG. 1, sulphuric acid and phosphate rock are fed into a reactor 1 together with recycled phosphoric acid. The conditions in the reactor are such as to produce a slurry containing phosphoric acid, gypsum crystals and residual sulphuric acid. The sulphuric acid fed to the reactor has a concentration of at least 77% and the temperature is maintained at between 60°C and 70°C. In the process of the invention it is preferred to operate so that the product contains about 38% $P_2O_5$, about 0.5% $SO_3$ and 33–40% of suspended solids.

The slurry is then transferred to a second vessel 2, to which sulphuric acid of at least 93% concentration is added in a quantity necessary to raise the temperature of the slurry to a value at which the gypsum is converted into the hemihydrate. Under the conditions of ionic concentration employed as stated above this is at about 75°C. The quantity of sulphuric acid necessary for this is about one third of that required for the initial reaction, on a weight basis. If heat losses are high, the heat due to the addition of sulphuric acid is supplemented by some sensible heat, e.g. by passing the slurry through a heat exchanger or by blowing in live steam. The sulphuric acid may be in the form of oleum for example of strength above 104% equivalent $H_2SO_4$. The resulting slurry contains about 7% of $SO_3$ and 33% of $P_2O_5$, the percentage of the latter having been reduced by water liberated from the gypsum.

The slurry is passed to a filter 3 to separate the phosphoric acid from the precipitated calcium sulphate hemihydrate and the crystals of the latter are washed. We have found, surprisingly, that there is little or no reconversion of the hemihydrate to gypsum on the filter 3, and that the crystals are easily filtered. They contain only about 0.1% of $P_2O_5$. The solid material is washed with water and the washings are recycled to the initial reaction vessel 1, and the crystals collected in a vessel 4. The amount of water used is such as to maintain the correct concentration of acid in system bearing in mind the strength of the initial sulphuric acid.

The filtrate, which is collected in a vessel 5, is a solution of phosporic acid containing about 33% $P_2O_5$ and 7% $SO_3$.

FIGS. 2 and 3 illustrate alternative processes according to the process of the invention in which the phosphoric acid produced by the process illustrated in FIG. 1 is subjected to a desulphation step. In the process illustrated in FIG. 2 phosphate rock is reacted with sulphuric acid in a reactor 6, the gypsum recrystallised to calcium sulphate hemihydrate in a vessel 7 and the resulting slurry filtered in a filter 8 and the calcium sulphate hemihydrate precipitated is washed, the washings being returned to the reactor 1, and the hemihydrate is removed to a vessel 9. The phosphoric acid filtrate obtained from the filter 8 is transferred to a further vessel 10 where there is added to it the necessary quantity of phosphate rock to desulphate the acid, that is approximately the stoichiometric quantity based on the amount of $SO_3$ present. The determination of the amount of $SO_3$ present may be carried out in any convenient manner but we have found it particularly useful to employ a process as described in our co-pending Ser. No. 674,495, now U.S. Pat. No. 3,582,284 wherein a metered flow of the phosphoric acid substantially free from suspended solid, and a metered flow of barium ion are mixed and the resulting solution passed through a turbidimetric cell.

The addition of phosphate rock results in the formation of a slurry of desulphated phosphoric acid (which contains about 0.5% $SO_3$) and gypsum crystals which is passed to a filter 11, to filter off the gypsum crystals, which are returned to the initial reaction vessel 6 and the product acid filtrate, which contains about 36% $P_2O_5$ and 0.5% $SO_3$ is passed to a vessel 12.

FIG. 3 illustrates a further process according to the invention wherein the product acid undergoes desulphation. In this process phosphate rock is treated with sulphuric acid and recycled phosphoric acid as in the process described with reference to elements 6 to 10 of FIG. 2; to produce calcium sulphate hemihydrate crystals and a slurry of gypsum in desulphated phosphoric acid, the elements 13 to 17 in FIG. 3 corresponding to elements 6 to 10 of FIG. 2 respectively. The slurry of gypsum in phosphoric acid so produced is passed to a filter 18 and the separated gypsum crystals are recycled to the vessel 14 wherein the recrystallisation of the gypsum to hemihydrate takes place. The product acid, which contains about 36% $P_2O_5$ and 0.5% $SO_3$ is collected in the vessel 19.

EXAMPLE

Morrocan phosphate rock was fed into a vessel maintained at 70°C at the same time as sufficient sulphuric acid, containing 96% by weight $H_2SO_4$, to give 5 – 10g $SO_3$ per liter in the product acid together with recycled phosphoric acid, produced by the process, at a rate of 2.1 ml/gm of rock. The vessel being of such a size that the residence time was 4 hours.

The slurry of gypsum in phosphoric acid so formed was transferred to a second vessel maintained at 75°C and sulphuric acid, at 96% concentration, added in a proportion such that 5 ml of acid were added for each 90 ml of slurry. This resulted in the slurry of gypsum present being converted to a slurry of calcium sulphate hemihydrate having a solids content of approximately 30% and a liquid phase containing 33.5% $P_2O_5$ and 8% $H_2SO_4$. The residence time of the slurry in this vessel was 2¼ hours.

The slurry resulting from the treatment in the second vessel was then filtered and the strong filtrate passed on to the next stage. The calcium sulphate hemihydrate crystals separated were washed to remove any phosphoric acid and the washings recycled to the first reaction vessel. The calcium sulphate hemihydrate crystals produced contained about 0.083% insoluble $P_2O_5$ 0.008% soluble $P_2O_5$ this making a total $P_2O_5$ content of about 0.091% which was low enough to enable the calcium sulphate hemihydrate formed to be used in the production of $SO_2$ and cement clinker which was of good strength and high quality.

The strong filtrate from the filtration stage which contained about 33.5% $P_2O_5$ and 8% $H_2SO_4$ was treated in a vessel maintained at 70°C with the necessary amount of Morrocan phosphate rock to precipitate the $H_2SO_4$ present as gypsum. The residue time in this vessel was 2 hours. The gypsum was then filtered off without washing and recycled to the first reaction vessel. The acid filtrate contained 38% $P_2O_5$ and 5g $SO_3$/liter and was suitable for the manufacture of fertilizers and alkali metal phosphates and for any other use for which wet process phosphoric acid is normally used.

We claim:

1. A process for the production of phosphoric acid and calcium sulphate hemihydrate which comprises reacting calcium-containing phosphate rock with sulphuric acid in a first reactor at a temperature between about 60°C and 70°C to precipitate the calcium in said phosphate rock as gypsum slurried with phosphoric acid, transferring the gypsum-phosphoric acid slurry to a second reactor, adding sulphuric acid in a concentration of at least 93% by weight and in an amount sufficient to bring about an $SO_3$ content of about 7% by weight based on the total contents of the said second reactor and so as to result in a temperature rise to about 75°C so as to cause the gypsum to recrystallize into solid calcium sulphate hemihydrate, the contents of said second reactor having a $P_2O_5$ content of about 33% by weight based on the total contents of said second reactor, and separating said calcium sulphate hemihydrate from the phosphoric acid in said slurry.

2. The process of claim 1, wherein the sulphuric acid added to said first reactor and reacted with said phosphate rock is in a concentration of at least 77% by weight.

3. The process of claim 2, wherein about one-quarter of the total weight of sulphuric acid utilized in said process is added to said second reactor and the remaining amount of sulphuric acid used in said process is added to said first reactor.

4. A cyclic process for the production of phosphoric acid and calcium sulphate hemihydrate which comprises reacting calcium-containing phosphate rock with sulphuric acid in a concentration of at least 77% by weight in a first reactor to precipitate the calcium in said phosphate rock as gypsum slurried with phosphoric acid, transferred the gypsum slurry to a second reactor and adding sufficient sulphuric acid in a concentration of at least about 93% by weight to raise the temperature of the contents of said second reactor to about 75°C and to bring about an $SO_2$ content of about 7% by weight based on the total content of the said second reactor so as to recrystallize the gypsum into solid calcium sulphate hemihydrate, the contents of said second reactor having a $P_2O_5$ content of about 33% by weight based on the total contents of said second reactor, filtering said calcium sulphate hemihydrate from the phosphoric acid in said slurry to obtain a calcium sulphate hemihydrate product and phosphoric acid filtrate, and adding sufficient phosphate rock to said phosphoric acid filtrate to precipitate gypsum and recycling said precipitated gypsum to said first reactor.

5. A cyclic process for the production of phosphoric acid and calcium sulphate hemihydrate which comprises reacting calcium-containing phosphate rock with sulphuric acid in a concentration of at least 77% by weight in a first reactor to precipitate the calcium in said phosphate rock as gypsum slurried with phosphoric acid, transferring the gypsum slurry to a second reactor and adding sufficient sulphuric acid in a concentration of at least about 93% by weight to raise the temperature of the contents of said second reactor to about 75°C and to bring about an $SO_3$ content of about 7% by weight based on the total content of the said second reactor so as to recrystallize the gypsum into solid calcium sulphate hemihydrate, the contents of said second reactor having a $P_2O_5$ content of about 33% by weight based on the total contents of said second reactor, filtering said calcium sulphate hemihydrate from the phosphoric acid in said slurry to obtain a calcium sulphate hemihydrate product and phosphoric acid filtrate, and adding sufficient phosphate rock to said phosphoric acid filtrate to precipitate gypsum and recycling said precipitated gypsum to said second reactor.

* * * * *